(No Model.)

A. HEUSSER.
WHIFFLETREE COUPLING.

No. 359,018.          Patented Mar. 8, 1887.

WITNESSES:
Dorr Twitchell
C. Sedgwick

INVENTOR:
A. Heusser
BY Munn & Co
ATTORNEYS.

UNITED STATES PATENT OFFICE.

ALBERT HEUSSER, OF TAYLOR, NEVADA.

WHIFFLETREE-COUPLING.

SPECIFICATION forming part of Letters Patent No. 359,018, dated March 8, 1887.

Application filed August 17, 1886. Serial No. 211,144. (No model.)

*To all whom it may concern:*

Be it known that I, ALBERT HEUSSER, of Taylor, in the county of White Pine and State of Nevada, have invented a new and Improved Whiffletree-Coupling, of which the following is a full, clear, and exact description.

My invention relates to couplings adapted for connecting whiffletrees to double-trees and for coupling parts of the running-gear of vehicles or other structures or machines, and has for its object to provide a simple, strong, durable, and effective coupling of this character, which will allow free pivotal movement of the coupled parts in one plane, and will prevent rocking movement of the coupled parts on each other.

The invention consists in certain novel features of construction and combinations of parts of the coupling, all as hereinafter fully described and claimed.

Reference is to be had to the accompanying drawings, forming a part of this specification, in which similar letters of reference indicate corresponding parts in all the figures.

Figure 1 is a perspective view of my improved coupling as applied to use in connecting a whiffletree to a double-tree, said trees being shown only in part. Fig. 2 is a plan view of the end of the double-tree and the lower half or part of the coupling; and Fig. 3 is a vertical section through the whiffletree, double-tree, and the coupling.

The coupling consists of two main parts, A B, adapted for attachment to a whiffletree and double-tree, respectively, and having lugs $a\,b$, respectively, provided with oppositely-projecting bosses $a'\,b'$, through which lugs and bosses a bolt, C, is passed for pivoting the two parts of the coupling together. A nut, $c$, holds the bolt to place. One part of the coupling—the part B, for instance—has a round boss, D, which enters a correspondingly-shaped recess in the other part, A, of the coupling, thereby relieving the pivot-bolt C of most or all of the strain to which it might otherwise be subjected.

The coupling-sections A B have countersunk holes at their opposing faces to receive the heads of bolts E F, by which the parts A B of the coupling are rigidly fastened to the whiffletree G and double-tree H, respectively, as will be understood from the drawings.

One of the parts of the coupling—the part B, for instance—is provided with a flange, I, which projects from the face of part B, and is curved on a circle struck from the pivot-bolt C as a center, and on this flange I is formed an inwardly-projecting lip or flange, $i$, providing a groove, J, in which a curved tongue, K, formed on the adjacent edge of the other part, A, of the coupling, is adapted to move as the whiffletree is swung either way on the pivot-bolt C.

It is obvious that the engagement of the tongue K in the groove J holds the opposing faces of the pivoted parts A B of the coupling to each other, and prevents lateral rocking of the whiffletree and double-tree on each other, which effect is further promoted by the passage of the pivot-bolt C through the long bosses $a'\,b'$ of the two parts of the coupling.

The tongue-and-groove joint K J may be substituted by a half-dovetailed or other suitable undercut joint, having a like effect to prevent lateral rocking of the coupled parts A B.

The above-described coupling, which is strong, durable, cheap, and effective, is adapted, also, for use in coupling bolsters to head-blocks of vehicle running-gear, and for coupling other parts of vehicles or machinery where a strong non-rocking pivotal connection is required.

Having thus fully described my invention, I claim as new and desire to secure by Letters Patent—

1. The combination, in a whiffletree-coupling, of two plates, A B, adapted for attachment to the parts to be coupled and provided, respectively, at one edge with lugs $a\,b$ and bosses $a'\,b'$, a bolt, C, passing through said lugs and bosses, and an interlocking tongue-and-groove or undercut joint, as at I J K, at the other edge of the plates, substantially as shown and described.

2. The combination, in a whiffletree-coupling, of two plates, A B, provided at one edge with lugs $a\,b$ and bosses $a'\,b'$, and one of said lugs having a boss, D, fitting in a recess of the opposite lug, a bolt, C, passing through said lugs and bosses, and an interlocking tongue-and-groove or undercut joint, as at I J K, at the other edge of the plates, substantially as shown and described.

ALBERT HEUSSER.

Witnesses:
 WILLIAM B. GRAHAM,
 H. CARPENTER.